United States Patent
Harada et al.

(10) Patent No.: US 10,803,655 B2
(45) Date of Patent: Oct. 13, 2020

(54) FORWARD RENDERING PIPELINE WITH LIGHT CULLING

(71) Applicant: Advanced Micro Devices, Inc., Sunnyvale, CA (US)

(72) Inventors: Takahiro Harada, Santa Clara, CA (US); Jerry McKee, Campbell, CA (US); Jason Yang, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 973 days.

(21) Appl. No.: 13/892,712

(22) Filed: May 13, 2013

(65) Prior Publication Data

US 2013/0328873 A1 Dec. 12, 2013

Related U.S. Application Data

(60) Provisional application No. 61/657,438, filed on Jun. 8, 2012.

(51) Int. Cl.
*G06T 15/40* (2011.01)
*G06T 15/80* (2011.01)
*G06T 15/50* (2011.01)

(52) U.S. Cl.
CPC ........... *G06T 15/405* (2013.01); *G06T 15/40* (2013.01); *G06T 15/506* (2013.01); *G06T 15/80* (2013.01)

(58) Field of Classification Search
CPC .............................. G06T 15/405; G06T 15/40
USPC ....................................................... 345/422
See application file for complete search history.

(56) References Cited

U.S. PATENT DOCUMENTS

| | | | | |
|---|---|---|---|---|
| 8,542,247 B1* | 9/2013 | Hakura et al. | ................ | 345/620 |
| 2007/0273689 A1* | 11/2007 | Tsao | ............................ | 345/422 |
| 2008/0170066 A1* | 7/2008 | Falchetto | ..................... | 345/419 |
| 2010/0295851 A1* | 11/2010 | Diamand | ...................... | 345/422 |
| 2013/0293544 A1* | 11/2013 | Schreyer et al. | ............. | 345/426 |

OTHER PUBLICATIONS

Johan Andersson. "Parallel Graphics in Frostbite—Current & Future." Siggraph Course: Beyond Programmable Shading, 2009. Available at http://s09.idav.ucdavis.edu/talks/04-JAndersson-ParallelFrostbite-Siggraph09.pdf.*
Sashidhar Guntury and P J Narayanan, "Ray Tracing Dynamic Scenes with Shadows on the GPU", Eurographics Symposium on Parallel Graphics and Visualization (2010).*
Aras, "2012 Theory for Forward Rendering", Mar. 2, 2012, http://aras-p.info/blog/2012/03/02/2012-theory-for-forward-rendering/.*
Olsson O., Assarsson U.: Tiled shading. Journal of Graphics, GPU, and Game Tools 15, 4 (2011), 235-251.*

(Continued)

*Primary Examiner* — Jin Ge
(74) *Attorney, Agent, or Firm* — Volpe and Koenig, P.C.

(57) ABSTRACT

A method for enhanced forward rendering is disclosed which includes a depth pre-pass, light culling and a final shading. The depth pre-pass minimizes the cost of final shading by avoiding high pixel overdraw. The light culling stage calculates a list of light indices overlapping a pixel. The light indices are calculated on a per-tile basis, where the screen has been split into units of tiles. The final shading evaluates materials using information stored for each light. The forward rendering method may be executed on a processor, such as a single graphics processing unit (GPU) for example.

27 Claims, 15 Drawing Sheets
(7 of 15 Drawing Sheet(s) Filed in Color)

(56) References Cited

OTHER PUBLICATIONS

Martin Kinkelin & Christian Liensberger, "Instant Radiosity an Approach for Real-Time Global Illumination", ICGA/TU Wien SS2008.*
Steven Tovey and Stephen McAuley, "Parallelized Light Pre-Pass rendering with the cell Broadband Engine", GPU Pro Advanced Rendering Techniques Edited by Wolfgang Engel A K Peters/CRC Press 2010 pp. 509-528.*
Eisemann, E., and D'E Coret, X. 2006. Fast scene voxelization and applications.In ACM Siggraph Symposium on Interactive 3D Graphics and Games, 71-78.*
Johan Andersson, Bending the Graphics Pipeline, ACM Siggraph 2010.*
"Forward+: Bringing Deferred Lighting to the Next Level"; Harada et al.; Advanced Micro Devices, Inc.; Computer Graphics Forum; vol. 0 (1981) No. 0 pp. 1-4.
Andersson, J., "Direct X 11 Rendering in Battlefield 3," Presentation, Game Developers Conference, San Francisco, CA, 2011.
Dachsbacher, C. et al., "Reflective Shadow Maps," In Symposium on Interactive 3D Graphics and Games (I3D), pp. 203-231. New York: ACM, 2005.
Yang, J.C., et al., "Real-Time Concurrent Linked List Construction on the Gpu." Computer Graphics Forum 29:4 (2010), 1297-1304.
Ericson, C., "Real Time Collision Detection," San Francisco: Morgan Kaufmann, 2004.
Kaplanyan, a., "CryENGINE 3: Reaching the speed of light," ACM SIGGRAPH 2010 Courses (2010). 1.
Trebilco, D., "Light indexed deferred rendering," in ShaderX7 (2009), Charles River Media 2.

* cited by examiner

FORWARD RENDERING PIPELINE WITH LIGHT CULLING

CROSS REFERENCE TO RELATED APPLICATIONS

This application claims the benefit of U.S. provisional application No. 61/657,438 filed Jun. 8, 2012, the contents of which is hereby incorporated by reference herein.

TECHNICAL FIELD

The disclosed embodiments are generally directed to rendering.

BACKGROUND

In recent years, deferred rendering has gained in popularity for rendering in real time, especially in games. The major advantages of deferred techniques are the ability to use many lights, decoupling of lighting from geometry complexity, and manageable shader combinations. However, deferred techniques have disadvantages such as limited material variety, higher memory and bandwidth requirements, handling of transparent objects, and lack of hardware anti-aliasing support. Material variety is critical to achieving realistic shading results, which is not a problem for forward rendering. However, forward rendering normally requires setting a small fixed number of lights to limit the potential explosion of shader permutations and needs processor management of the lights and objects.

SUMMARY

A method for enhanced forward rendering is disclosed which includes depth pre-pass, light culling and final shading. The depth pre-pass minimizes the cost of final shading by avoiding high pixel overdraw. The light culling stage calculates a list of light indices overlapping a pixel. The light indices are calculated on a per-tile basis, where the screen has been split into units of tiles. The final shading evaluates materials using information stored for each light. The forward rendering method may be executed on a processor, such as a single graphics processing unit (GPU) for example.

BRIEF DESCRIPTION OF THE DRAWINGS

The patent or application file contains at least one drawing executed in color. Copies of this patent or patent application publication with color drawing(s) will be provided by the Office upon request and payment of the necessary fee. A more detailed understanding may be had from the following description, given by way of example in conjunction with the accompanying drawings wherein.

DETAILED DESCRIPTION

Processors, such as graphics processing unit (GPU) hardware, along with the feature set provided by a DirectX 11 application programming interface (API) provide developers more flexibility to choose among a variety of rendering pipelines. The latest GPUs have improved performance, more arithmetic and logic unit (ALU) power and flexibility, and the ability to perform general computation, (in contrast to some current game consoles). In order to exploit the performance of modern GPUs, a rendering pipeline is used that takes advantage of GPU hardware features, scales well, and provides flexibility for artists, tech artists, and programmers to achieve high-quality rendering with unique visuals. The ability to produce high-quality renderings that approach the styling in computer-generated (CG) films will require great flexibility to support arbitrary data formats and shading units or shaders for more sophisticated rendering of surface materials and special effects.

The selected rendering pipeline needs to at meet some minimum objectives or requirements. For example, materials may need to be both physically and non-physically based. Tech artists will want to build large trees of materials made of arbitrary complexity. Material types will likely be similar to those found in offline renderers such as RenderMan®, (which is a registered trademark of the Pixar Corporation), mental ray, and Maxwell Render®, (which is a registered trademark of Next Limit, S.L.), shading systems. In another example, artists want complete freedom regarding the number of lights that can be placed in a scene at once. In another example, rendering data should be decoupled from the underlying rendering engine. Artists and programmers should be able to write shaders and new materials freely at runtime for quick turnaround; going from concept to seeing results should be fast and easy. The architecture should be simple and not get in the way of creative expression.

Described herein is an apparatus and method for forward rendering with a multiplicity of lights by introducing light culling into a forward rendering pipeline. The described forward rendering pipeline meets at least the above noted objectives and is a good match for modern GPU hardware going into the foreseeable future.

Figure 1:
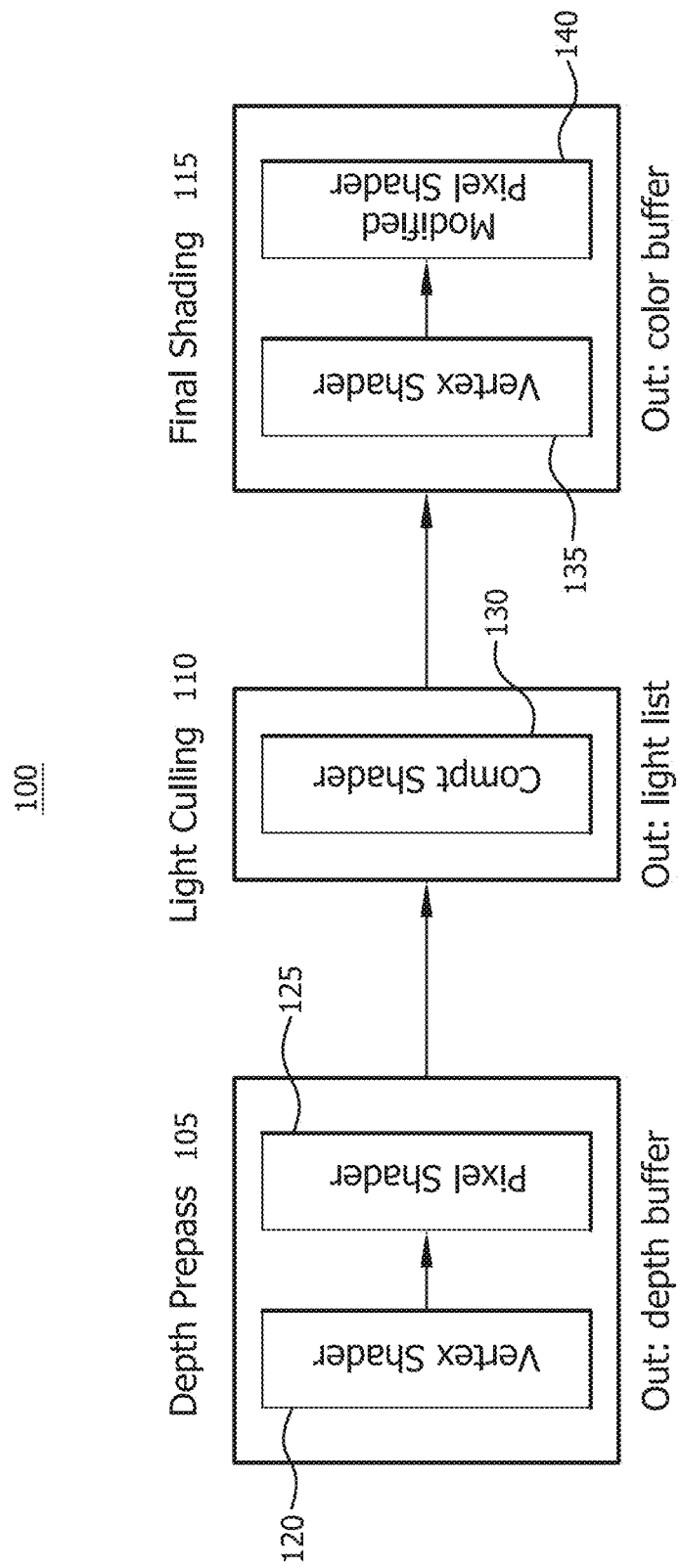
FIG. 1 is an example forward rendering pipeline in accordance with some embodiments.

FIG. 1 is an example of a forward rendering pipeline 100 in accordance with some embodiments. In general, the forward rendering pipeline 100 includes three stages: a depth or Z pre-pass stage 105, a light culling stage 110 and a final shading stage 115. The depth pre-pass stage 105 uses, in an embodiment, a vertex shader 120 and a pixel shader 125. The vertex shader 120 determines or describes the traits/characteristics of a vertex, including but not limited to, position, texture coordinates, colors, and the like. The pixel shader 125 determines or describes the traits/characteristics of a pixel, including but not limited to, z-depth. During the depth pre-pass stage 105, only the depth value for a pixel of a polygon is rendered and stored in a depth or Z buffer. The depth pre-pass stage 105 reduces the pixel overdraws of the final shading stage 115. This is especially expensive for forward rendering pipeline 100 due to the possible traversal of many lights per pixel, as described herein below. The shaders described herein may be hardware, modules, code segments and the like.

The light culling stage 110 uses a compute shader 130 to calculate the list of lights affecting a pixel. During the light culling stage 110, for a screen which has been divided into tiles, (2D cells), light indices are calculated on a per-tile basis, which reduces memory footprint and computation. The light culling stage 110 produces a list of lights to be used during final shading stage 115.

The final shading stage 115 uses a vertex shader 135 and a modified pixel shader 140 to perform material evaluation based on stored light information, such as light position and color. Light accumulation and shading occurs simultaneously using complete material and lighting information. The final shading stage 115 shades the entire surface. A required change is the way to pass lights to shaders. Any lights in a scene have to be accessible from shaders or shader codes rather than binding some subset of lights for each object as is typical of traditional forward rendering.

Figure 2A:
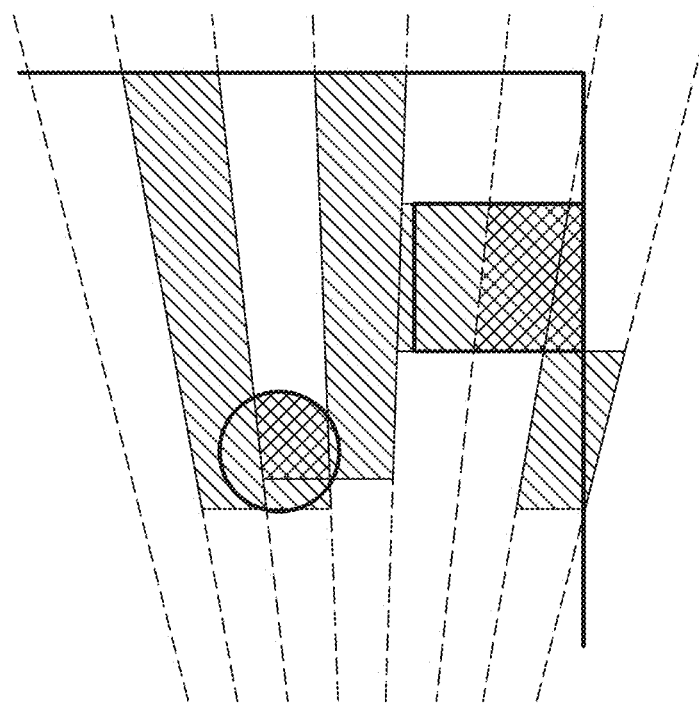
FIGS. 2A and 2B show an example of light culling in 2D in accordance with some embodiments.
Figure 2B:
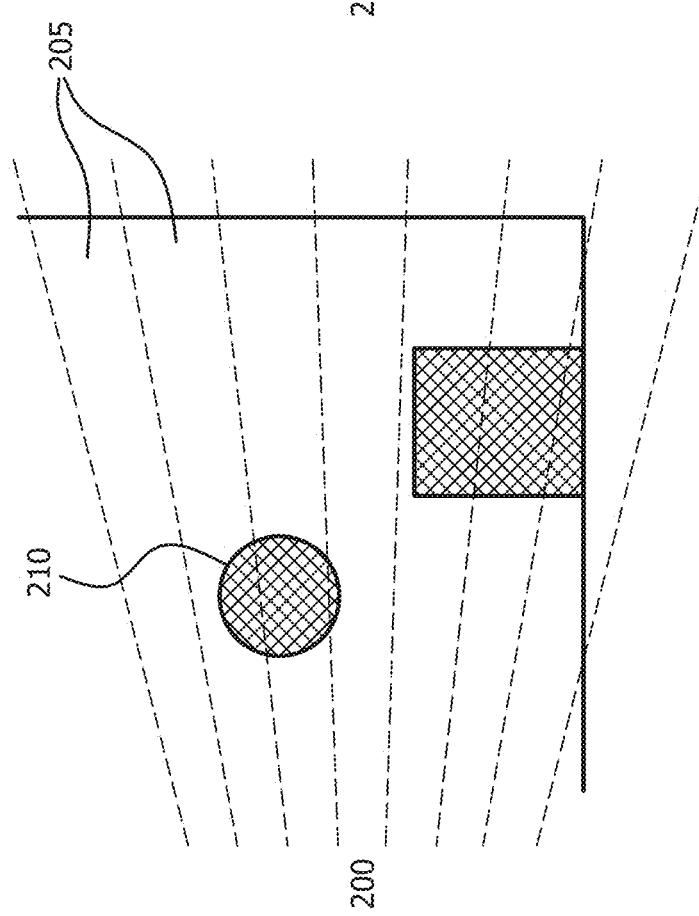

Described herein is light culling in accordance with some embodiments. The light culling stage 110 calculates a list of light indices overlapping a pixel. In an embodiment, the list of lights can be calculated for each pixel, (which works well with final shading methods). However, storing a per-pixel light list requires a large memory footprint and significant computation at light culling stage 110. In another embodiment, a screen is split into tiles and light indices are calculated on a per-tile basis. Although tiling can add false positives to the list for a pixel in a tile, it reduces the overall memory footprint and computation time necessary for generating the light lists. It is a trade-off between light-index buffer memory and final shader efficiency. By utilizing the computing capability of modern GPUs, light culling can be implemented entirely on the GPU as described herein below. Therefore, the forward lighting pipeline 100 can be executed entirely on the GPU. FIGS. 2A and 2B illustrate an example of this later embodiment and in particular, show a 2D graphical explanation of light culling. If a camera 200 is placed on the left, the light grey dashed lines indicate tile borders for each tile 205. As described herein below, during the light culling stage 110 of FIG. 1, a frustum is created or generated for each tile bounded by minimum and maximum depth of pixels 210 in a tile 205.

Described herein is final shading. Whereas light culling creates the list of lights overlapping each pixel, final shading loops through the list of lights and evaluates materials using material parameters describing the surface properties of the rendered object along with information stored for each light. With unordered access view (UAV) support, per-material instance information can be stored and accessed in linear structured buffers passed to material shaders. Therefore, the full render equation may be satisfied without limitation because light accumulation and shading happen simultaneously in one place with complete material and light information. Use of complex materials and more accurate lighting models to improve visual quality is not constrained other than by the GPU computational cost, which is largely determined by the average number of overlapping lights on each pixel multiplied by the average cost for material calculation. With this prior method, high pixel overdraw can kill performance; therefore, it was recognized that a depth pre-pass may be needed to minimize the cost of final shading.

Described herein is an example implementation and optimization for a forward rendering pipeline in accordance with some embodiments. As described herein above, the forward rendering pipeline now includes a light-culling stage and modified pixel shader in the final shading stage. The light-culling stage can be implemented in several ways due to the flexibility of current GPUs, (namely the use of direct compute and read-writable structure data buffers or UAVs). The example implementation is described with reference to DirectX 11 but other like APIs may be used. The light-culling implementation described herein below works well for a scene with thousands of lights. If there are more lights, the scatter approach described herein below may be used.

Described herein is a gather-based light culling implementation in accordance with some embodiments. During light culling, the computation is done on a by-tile basis. Therefore, it is natural to execute a thread group for a tile. A thread group can share data using thread group shared memory, (hereinafter referred to as shared memory), which can reduce a lot of redundant computation in a thread group. The computation is identical for each tile. The compute shader for light culling is executed as a two-dimensional (2D) work group. A thread group is assigned a unique 2D index, and a thread in a thread group is assigned a unique 2D index in the group. In the pseudo code described herein below, the following macros are defined:

GET_GROUP_IDX: thread group index in X direction (SV_GroupID)

GET_GROUP_IDY: thread group index in Y direction (SV_GroupID)

GET_GLOBAL_IDX: global thread index in X direction (SV_DispatchThreadID)

GET_GLOBAL_IDY: global thread index in Y direction (SV_DispatchThreadID)

GET_LOCAL_IDX: local thread index in X direction (SV_GroupThreadID)

GET_LOCAL_IDY: local thread index in Y direction (SV_GroupThreadID).

The first step is computation of a frustum of a tile in view space. To reconstruct four side faces, the view-space coordinates are calculated of the four corner points of the tile. With these four points and the origin, four side planes can be constructed. The pseudo code for this is shown in Table 1.

TABLE 1

```
float4 frustum [4];
{ // construct frustum
    float4 v[4];
    v[0]= projToView(8* GET_GROUP_IDX, 8*
    GET_GROUP_IDY ,1.f) );
    v[1]= projToView(8*( GET_GROUP_IDX+1), 8*
    GET_GROUP_IDY ,1.f) );
```

TABLE 1-continued

```
        v[2]= projToView(8*( GET_GROUP_IDX+1) ,8*
        (GET_GROUP_IDY+1),1.f));
        v[3]= projToView(8* GET_GROUP_IDX, 8*
        GET_GROUP_IDY+1),1.f) );
        float4 o = make_float4(0.f ,0.f ,0.f ,0.f);
        for(int i=0; i <4; i++)
                frustum [i] = createEquation( o, v[i], v[(i+1)&3] );
}
```

The projToView( ) function that takes screen-space pixel indices and depth value and returns coordinates in view space. The createEquation ( ) function creates a plane equation from three vertex positions. The frustum at this point has infinite length in the depth direction. The frustum can be clipped by using the maximum and minimum depth values of the pixels in the tile. To obtain the depth extent, a thread first reads the depth value of the assigned pixel from the depth buffer, which is created in the depth pre-pass stage. Then it is converted to the coordinate in view space. To select the maximum and minimum values among threads in a group, atomic operations to shared memory are used. This can be done if we launch a thread group for computation of a tile. The pseudo code for this is shown in Table 2.

TABLE 2

```
float depth = depthIn .Load(
uint3 (GET_GLOBAL_IDX ,GET_GLOBAL_IDY ,0) );
float4 viewPos = projToView(GET_GLOBAL_IDX ,
GET_GLOBAL_IDY , depth );
hit lIdx = GET_LOCAL_IDX + GET_LOCAL_IDY*8;
{// calculate bound
        if( lIdx == 0 )// initialize
        {
        ldsZMax = 0;
        ldsZMin = 0 xffffffff;
        }
        GroupMemoryBarrierWithGroupSync( );
        u32 z = asuint ( viewPos .z );
        if( depth != 1.f )
        {
                AtomMax ( ldsZMax , z );
                AtomMin ( ldsZMin , z );
        }
        GroupMemoryBarrierWithGroupSync( );
        maxZ = asfloat ( ldsZMax );
        minZ = asfloat ( ldsZMin );
        }
```

The ldsZMax and ldsZMin store maximum and minimum z coordinates, which are bounds of a frustum in the z direction, in shared memory. Once a frustum is constructed, the lights in the scene may be processed. Because there are several threads executed per tile, several lights can be culled at the same time. An 8×8 array is used for the size of a thread group and 64 lights can therefore be processed in parallel. The pseudo code for the test is shown in Table 3.

TABLE 3

```
for(int i=0; i< nBodies ; i+=64)
{
        int il = lIdx + i;
        if( il < nBodies )
        {
                if(overlaps (frustum , gLightGeometry[il]))
                {
                appendLightToList(il);
                }
        }
}
```

In overlaps( ), a light-geometry overlap is checked against a frustum using, for example, the separating axis theorem as described for example in C. Ericson. Real-Time Collision Detection. San Francisco: Morgan Kaufmann, 2004, the contents of which is incorporated by reference herein in its entirety, although other like methods may be used. If a light is overlapping the frustum, the light index is stored to the list of the overlapping lights in appendLightToList( ). There are several data structures that can be used to store the light list. For example, a linked list may be built using a few atomic operations as described, for example, in J. C. Yang, J. Hensley, H. Grun, and N. Thibieroz. "Real-Time Concurrent Linked List Construction on the GPU." Computer Graphics Forum 29:4 (2010), 1297-1304, the contents of which is incorporated by reference herein in its entirety, although other like methods may be used. This approach uses a few global atomic operations to insert a light, and a global memory write is necessary whenever an overlapping light is found. In another example, a memory write is performed in two steps. A tile is computed by a thread group, and shared memory may be used for the first level storage. A light index storage and counter for the storage is allocated as shown in Table 4:

TABLE 4

```
groupshared u32 ldsLightIdx[LIGHT_CAPACITY];
groupshared u32 ldsLightIdxCounter;
```

In this example implementation, the variable LIGHT_CAPACITY is set to 256. The appendLightToList( ) is implemented as shown in Table 5:

TABLE 5

```
void appendLightToList( int I )
{
        u32 dstIdx = 0;
        InterlockedAdd( ldsLightIdxCounter, 1, dstIdx );
        if( dstIdx < LIGHT_CAPACITY )
                ldsLightIdx[ dstIdx ] = I;
}
```

With this implementation, no global memory write is necessary until all the lights are tested.

After testing all the lights against a frustum, indices of lights overlapping that frustum are collected in the shared memory. The last step is to write these to the global memory. For the storage of light indices in the global memory, two buffers are allocated: gLightIdx, which is a memory pool for the indices, and gLightIdxCounter, which is a memory counter for the memory pool. Memory sections for light indices for a tile are not allocated in advance and memory in gLightIdx should be reserved. This is done by an atomic operation to gLightIdxCounter using a thread in the thread group. Once a memory offset is obtained, the light indices are filled to the assigned contiguous memory of gLightIdx using all the threads in a thread group. The code for doing this memory write is shown in Table 6:

TABLE 6

```
{       // write back
        u32 startOffset = 0;
        if( lIdx == 0 )
        {// reserve memory
                if( ldsLightIdxCounter != 0 )
                        InterlockedAdd( gLightIdxCounter ,
                        ldsLightIdxCounter, startOffset );
```

TABLE 6-continued

```
            ptLowerBound[ tileIdx ] = startOffset;
            ldsLightIdxStart = startOffset;
        }
        GroupMemoryBarrierWithGroupSync( );
        startOffset = ldsLightIdxStart;
        fo (int i=lIdx; i<ldsLightIdxCounter; i+=64)
        {
            gLightIdx[startOffset+i] = ldsLightIdx[i];
        }
}
```

The shader engine or module for the light culling stage reads light geometry, (for spherical lights, that includes the location of the light and its radius). There are several options for the memory storage for lights. For example, light geometry and lighting properties, such as intensity and falloff, can be packed into to a single structure. This structure would have the right data for the light culling stage but the data would be padded with light properties not used by the light culling stage. A processor, for example a GPU, usually reads data by page. Therefore, it is likely to transfer lighting properties as well as light geometry although they are not read by the shader program of the light culling stage when this data structure is employed for the lights.

In another example, the data structure can be implemented using two buffers, one for light geometry and another for lighting properties. The shader program for the light culling stage only touches the light geometry buffer, increasing the performance because no unnecessary data is read.

Described herein is a scatter approach for light culling. In this method, a determination is made of which tile a light overlaps and if so, writing a light and tile index data to a buffer. This is done by executing a thread per light. The data of the buffer, (ordered by light index at this point), needs to be sorted by tile index because a list of light indices per tile is needed. A radix sort is used and then kernels are run to find the start and end offsets of each tile in the buffer.

Described herein is an example implementation for final shading in accordance with some embodiments. For final shading, all objects in the view frustum are rendered with their authored materials. This is different than standard forward rendering because of the need to iterate through the lights overlapping each tile.

To write a pixel shader, "building blocks" were created of common operations for different shaders, making it easier to write different shaders. Table 7 illustrates two of the building blocks implemented as macros, LIGHT_LOOP_BEGIN and LIGHT_LOOP_END:

TABLE 7

```
# define LIGHT_LOOP_BEGIN
        int tileIndex = GetTileIndex(screenPos);
        uint startIndex , endIndex ;
        GetTileOffsets( tileIndex , startIndex , endIndex );
        for( uint lightListIdx = startIdx ;
            lightListIdx < endIdx ;
            lightListIdx++ )
        {
            int lightIdx = LightIndexBuffer[lightListIdx];
            LightParams directLight;
            LightParams indirectLight;
            if( isIndirectLight( lightIdx ) )
            {
                FetchIndirectLight(lightIdx , indirectLight);
            }
```

TABLE 7-continued

```
            else
            {
                FetchDirectLight( lightIndex , directLight );
            }
# define LIGHT_LOOP_END
        }
```

The LIGHT_LOOP_BEGIN macro first calculates the tile index of the pixel using its screen-space position. Then it opens a loop to iterate all the lights overlapping the tile and fills light parameters for direct and indirect light. The LIGHT_LOOP_END macro closes the loop. By using these building blocks, an implementation of a pixel shader is simple. For example, a shader for a microfacet surface is implemented as shown in Table 8:

TABLE 8

```
float4 PS ( PSInput i) : SV_TARGET
{
        float3 colorOut = 0;
# LIGHT_LOOP_BEGIN
        colorOut += EvaluateMicrofacet ( directLight , indirectLight );
# LIGHT_LOOP_END
        return float4 (colorOut, 1.f );
}
```

Other shaders can be implemented by just changing the lines between the two macros or modules. This building block approach also allows changes to the implementation easily based on performance needs. For example, the LIGHT_LOOP_BEGIN module may be changed to iterate a few lights on a slower platform. In another example, a host side optimization may include sorting all render draw calls by material type and render all triangles that belong to each unique material at the same time. This reduces GPU state change and makes good use of the cache because all pixels needing the same data will be rendered together.

Figure 3A:
FIGS. 3A and 3B show an example of a scene and number of lights overlapping, respectively, in accordance with some embodiments.
Figure 3B:
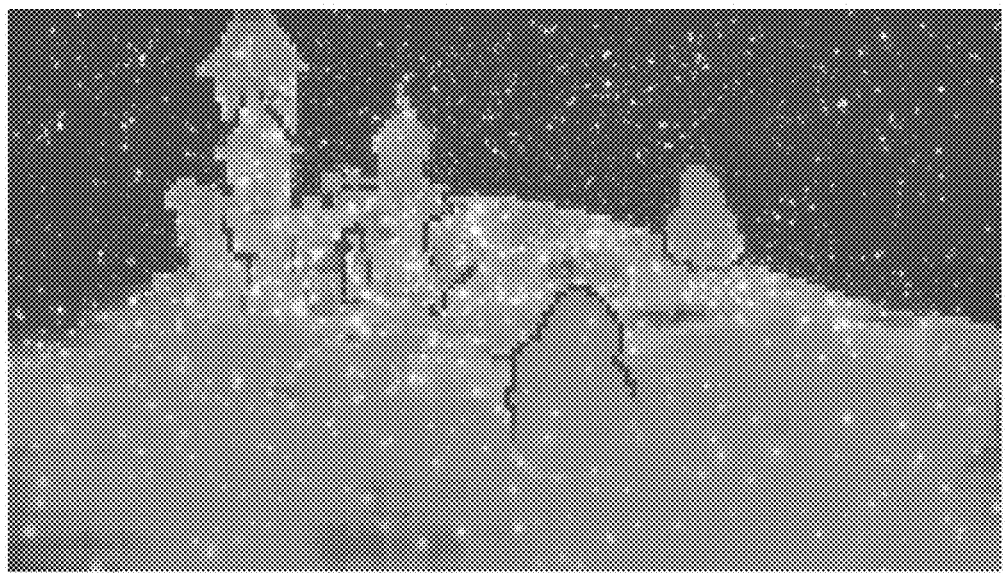

The above example implementation was benchmarked using the scene shown in FIG. 3A to compare the performance of the described forward rendering pipeline to compute-based deferred lighting. FIG. 3A shows a scene with 3,072 dynamic lights rendered in 1,280×720 resolution using diffuse lighting. FIG. 3B shows a visualization of the number of lights overlapping each tile. The blue, green and red tiles have 0, 25, and 50 lights, respectively. The numbers in between are shown as interpolated shades. The maximum number is clamped to 50.

Figure 4:
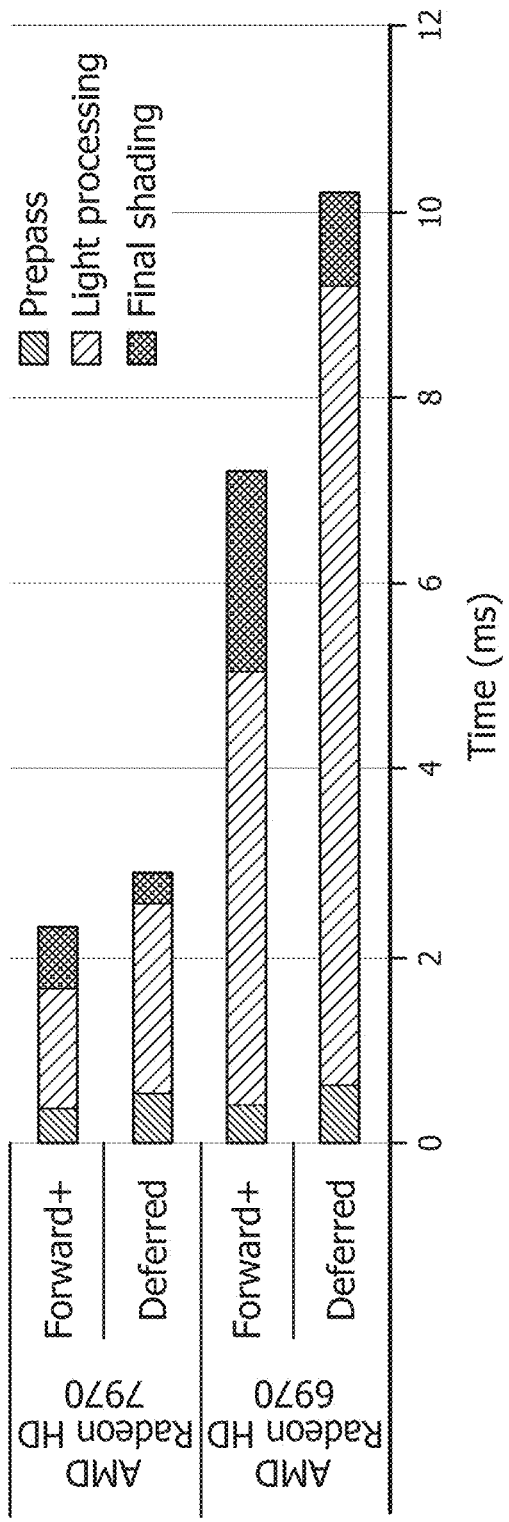
FIG. 4 is an example computation time for three stages in a forward rendering pipeline in accordance with some embodiments.

In short, the forward rendering pipeline was faster on both the Advance Micro Devices (AMD) Radeon HD 6970 and HD 7970 as shown in FIG. 4. This is supported by comparing the memory transfer size and the amount of computing. Three timers are placed in a frame of the benchmark to measure the time for the pre-pass, light processing, and final shading. In the described forward rendering pipeline, these three are depth pre-pass, light culling, and final shading. In the compute-based deferred pipeline, they are geometry pass (or G-pass), which exports geometry information to full screen buffers, screen-space light accumulation, and final shading.

The analysis is further supported in terms of each of the stages. For example, in the pre-pass stage, the forward rendering pipeline writes a screen-sized depth buffer while the deferred pipeline writes a depth buffer and another float4 buffer that packs the normal vector of the visible pixel. The specular coefficient can be stored in the W component of the buffer, too. Therefore, the forward rendering pipeline writes less than the deferred pipeline and is faster in the pre-pass stage.

In the light processing stage, the forward rendering pipeline reads the depth and light geometry buffers. The deferred pipeline also reads the depth and light geometry buffers, but the float4 buffer storing normal vectors and lighting properties has to be read as well because lighting is done at this stage. Therefore, the forward rendering pipeline has less memory read compared to the deferred pipeline. As for the amount of the computations, the forward rendering pipeline culls lights. On the other hand, the deferred pipeline not only culls lights but also performs lighting computation. The forward rendering pipeline has less computation. For the memory write, the forward rendering pipeline writes light indices, the sizes of which depend on the scene and tile size. If 8×8 tiles are used, the deferred pipeline has to write 8×8×4 bytes if a float4 data is written for each pixel. With this data size, the forward rendering pipeline can write 256 (8×8×4) light indices for a tile. If the number of lights is less than 256 per tile, the forward rendering pipeline writes less. In the test scene, there was no tile overlapped with more than 256 lights. In the light processing stage, the forward rendering pipeline is reading, computing, and writing less than the deferred pipeline. This is why the forward rendering pipeline is so fast at this stage.

In the final shading, the forward rendering pipeline takes more time compared to the deferred pipeline because the forward rendering pipeline has to iterate through all the lights in the pixel shader. This is designed this way to get more freedom.

Figure 5:
FIG. 5 is an example scene in accordance with some embodiments.

In another example, a forward rendering pipeline was implemented in real-time in a real-world setting. A grayscale version of a screenshot is shown in FIG. 5. Scene geometry was used that was on the order of what can be found in current personal computer (PC)-based video games (one to two million polygons). Rendering was done with a unique stylized look that could be characterized as computer generated (CG) "CGish" in that it uses material types that resemble those found in an offline renderer. There are more than 150 lights in the scenes. Artists created about 50 lights by hand. Other lights are dynamically spawned at runtime for one-bounce indirect illumination lighting using the techniques described herein below. Although the forward rendering pipeline is capable of using thousands of dynamic lights, a few hundred lights were more than enough for the artists to achieve their lighting goals, especially for a single-room indoor scene. A material system was used in which a material consists of N layers where each layer can have M weighted bidirectional reflectance distribution function (BRDF) models along with other physically based constants like those involving transmission, absorption, refraction, and reflections of incoming light.

Material parameters for a single layer include physical properties for lighting such as coefficients for a microfacet surface and a refractive index as well as many modifiers for standard lighting parameters. The numeric ranges are allowed to go beyond the "physically correct" values to give artists freedom to bend the rules for a given desired effect. For lighting, artists can dynamically create and place any number of omnidirectional lights and spotlights into a scene. The light data structure contains a material index mask. This variable is used to filter lights to only effect specific material types. While not physically correct, this greatly helps artists fine-tune lighting without unwanted side effects.

Described herein is one bounce indirect illumination. As a unique extension of the light-culling system, lights can be used as an indirect light to generate one bounce indirect illumination in the scene. If a given light is tagged to be an indirect light, the following will occur for that light before any rendering passes at runtime. A reflective shadow map (RSM) will be generated of the scene from the point of view of the light as described in C. Dachsbacher and M. Stamminger. "Reflective Shadow Maps." In Symposium on Interactive 3D Graphics and Games (I3D), pp. 203-231. New York: ACM, 2005, the contents of which is incorporated by reference herein in its entirety, although other like methods may be used. Normal buffer, color buffer, and world-space buffers are also generated. In addition, a compute shader is executed to create spotlights at the location captured in the RSM. The generated spotlights are appended to the main light list. The direction of the spotlight will be the reflection of the vector from the world position to the original indirect light around the normal. Other parameters are set for the new spotlight that conforms to the settings for the indirect light. Art-driven parameters are added to control the effect of indirect lighting.

This new "indirect" light type is used by artists to spawn virtual spotlights that represent one bounce lighting from the environment. This method seems to give artists good control over all aspects of lighting without requiring them to hand place thousands or millions of lights or prebake lightmaps. Each indirect light can spawn N×N virtual spotlights, so it takes only a handful to create a nice indirect lighting effect. Once virtual lights are spawned in the compute shader, they go through the same light-culling process as all the other lights in the system. Thus, the entire rendering pipeline remains simple.

Figure 6:
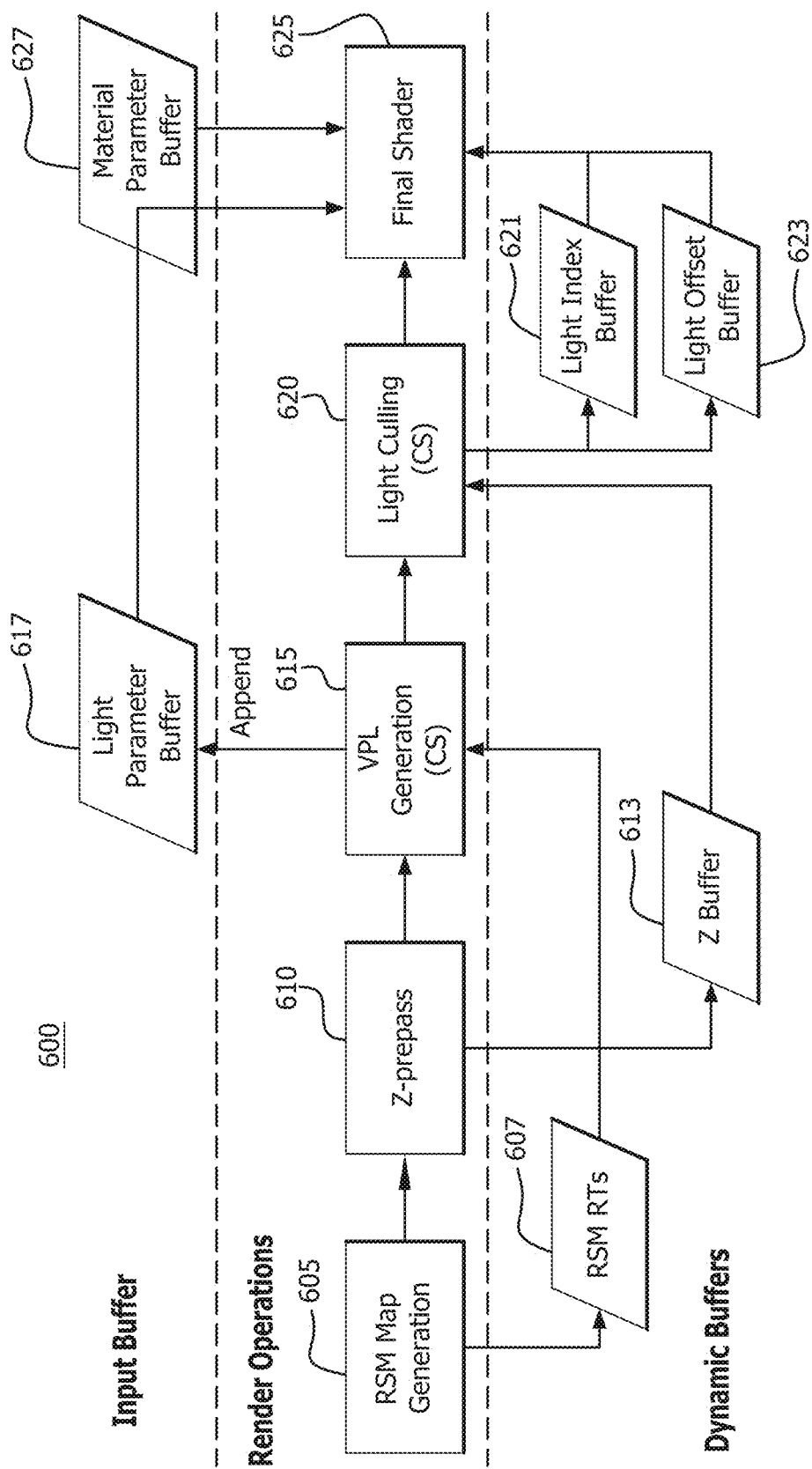
FIG. 6 is an example forward rendering pipeline with map generation in accordance with some embodiments.

FIG. 6 illustrates an example forward rendering pipeline 600 incorporating one bounce indirect light illumination. The forward rendering pipeline 600 includes a RSM map generation module 605, a Z pre-pass module 610, a virtual point lights (VPL) generation module 615, a light culling module 620 and a final shader module or engine 625. The VPL generation module 615 and light culling module 620 may be implemented in a compute shader (CS). The RSM map generation module 605 generates a RSM for lights tagged as indirect lights. The RSM output from the RSM map generation module 605 is stored in a dynamic buffer, for example, RSM render targets(RTs) 607. The flow then passes to the Z pre-pass module 610, which outputs depth values to a dynamic buffer, for example, Z buffer 613. The VPL generation module 615 uses the RSM map from the RSM RTs 607 to create spotlights at the location captured in the RSM. The generated spotlights are appended to the main light list and stored in a light parameter buffer 617. The light culling module 620 uses the depth values from the Z buffer 613 to calculate the list of lights affecting a pixel. The light culling module 60 generates light indices and light offsets that are stored in a light index buffer 621 and light offset buffer 623. The final shader engine 625 uses information from the light parameter buffer 617, light index buffer 621, light offset buffer 623 and material parameter buffer 627 to shade the entire surface.

Described herein is a 2.5D light culling forward rendering pipeline according to some embodiments. At the light-culling stage, light geometries are tested against a frustum of each tile that is clipped by the maximum and minimum depth values of a tile. This light culling works well if there is little variance in the depth in a tile. Otherwise, it may create a long frustum for a tile. This results in capturing a lot of lights for a tile, as we can see at the edge of geometries in FIG. 3B. This may occur even if some lights have no influence on any of the pixels in a tile because they fall at a void space in the frustum. As the number of lights reported for a tile increases, the computational cost of final shading increases. This is critical especially when the shading computation for a light is expensive. This is often the case because one of the motivations of employing the forward rendering pipeline is its ability to use sophisticated BRDFs for shading. The efficiency of culling may be improved in a number of ways. For example, the lights may be culled using a 3D grid. This may increase the computation as well as the size of the data to be exported. In another example, 2.5D culling may be used, which constructs a non-uniform 3D grid without adding a lot of computation or stressing the memory bandwidth.

Figure 7B:
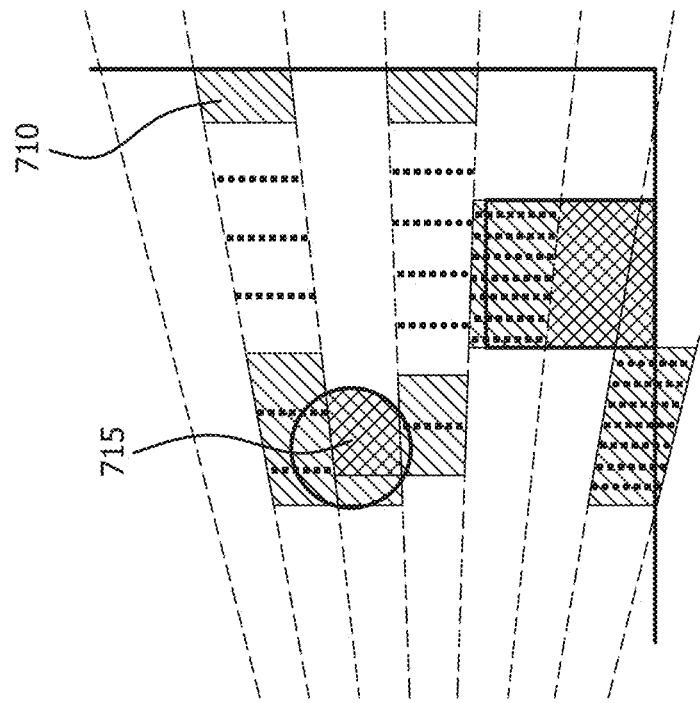
FIGS. 7A and 7B show an example of light culling in 2D in accordance with some embodiments.
Figure 7A:
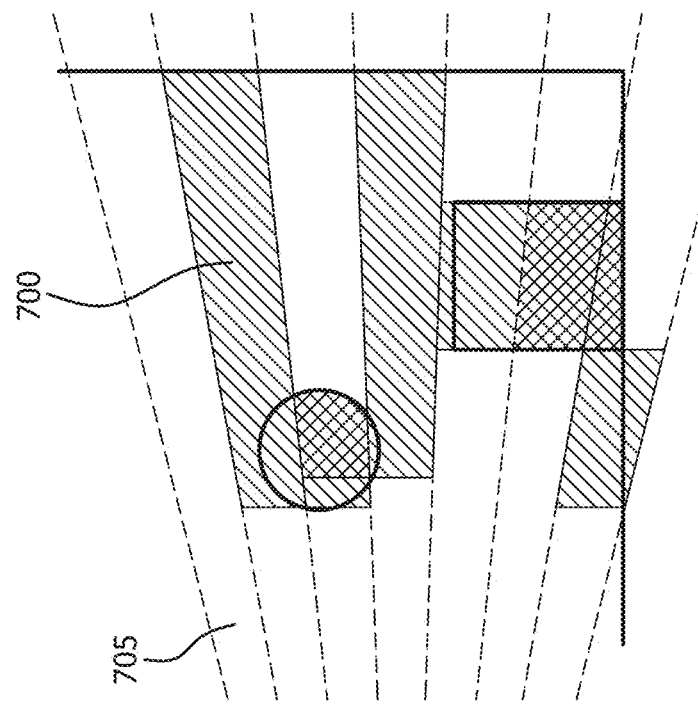

FIGS. 7A and 7B illustrate 2.5D culling in a forward rendering pipeline. As shown in FIG. 7A, a frustum 700 is created for a tile 705 in the same way as the screen-space culling described herein above. The depth extent of a frustum 700 is split into cells 710 in a tile 705. Cell indices are calculated based on the Z value of the pixel 715. A cell is then marked or flagged as occupied with respect to the pixel 715. The data constructed for a tile is termed a tile frustum and the flagged cells generate a tile depth mask. The tile depth mask may be, for example, a 32 bit value. To check overlap of light geometry on the tile, the light geometry first is checked against the tile frustum. If the light overlaps, a light depth mask is created for the light. This is done by calculating the extent of the light geometry in the depth direction of the frustum and flagging the cells to that extent. By comparing the light depth mask to the tile depth mask, the light is culled in the depth direction. Overlap of the light is reported only if there is at least one cell flagged by both depth masks. If a tile has a foreground and background, the 2.5D culling can detect and drop lights that fall between these two surfaces, thus reducing the number of lights to be processed at the final shading.

Described herein is an example implementation of 2.5D culling according to some embodiments. In this implementation, the 2.5D culling splits a frustum into 32 cells, and the occupancy information is stored in a 32 bit value. This cell data is allocated in shared memory to make it available to all threads in a group. The first modification to the shader module of the light culling stage is the construction of the tile depth mask of the surface. This is performed after calculating the frustum extent in the depth direction. The pitch of a cell is calculated from the frustum extent in the depth direction. Once the pitch and the minimum depth value are obtained, any depth value can be converted to a cell index. To create the tile depth mask, iterate through all the pixels in the tile and calculate a cell index for each pixel. Then a flag for the occupied cell is created by a bit shift, which is used to mark the tile depth mask in shared memory using an atomic logical-or operation.

Once we find a light overlapping the frustum, a light depth mask is created. The minimum and maximum depth values of the geometry are calculated and converted to cell indices. Once the cell indices are calculated, two bit-shift operations and a bit-and operation are necessary to create the light depth mask. If the light and surface occupy the same cell, light and tile depth masks have the same flag at the cell. Thus taking logical-and operation between these masks is enough to check the overlap.

Figure 8A:
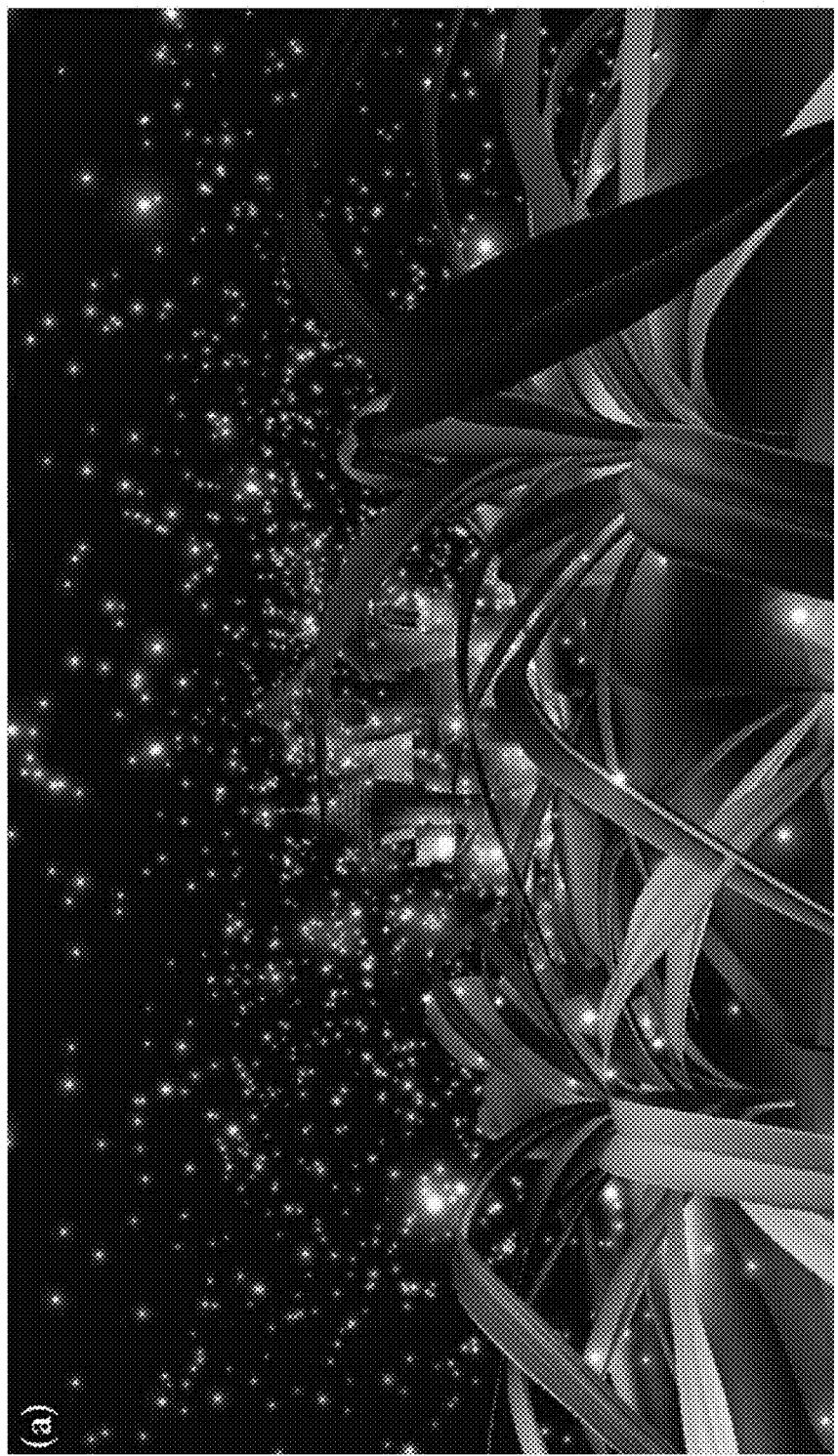
FIG. 8A is an example scene with a large depth variance in accordance with some embodiments.
Figure 8B:
FIGS. 8B and 8C show the number of lights per tile using fustrum culling (2D culling) and 2.5D culling, respectively, in accordance with some embodiments.
Figure 8C:
Figure 9A:
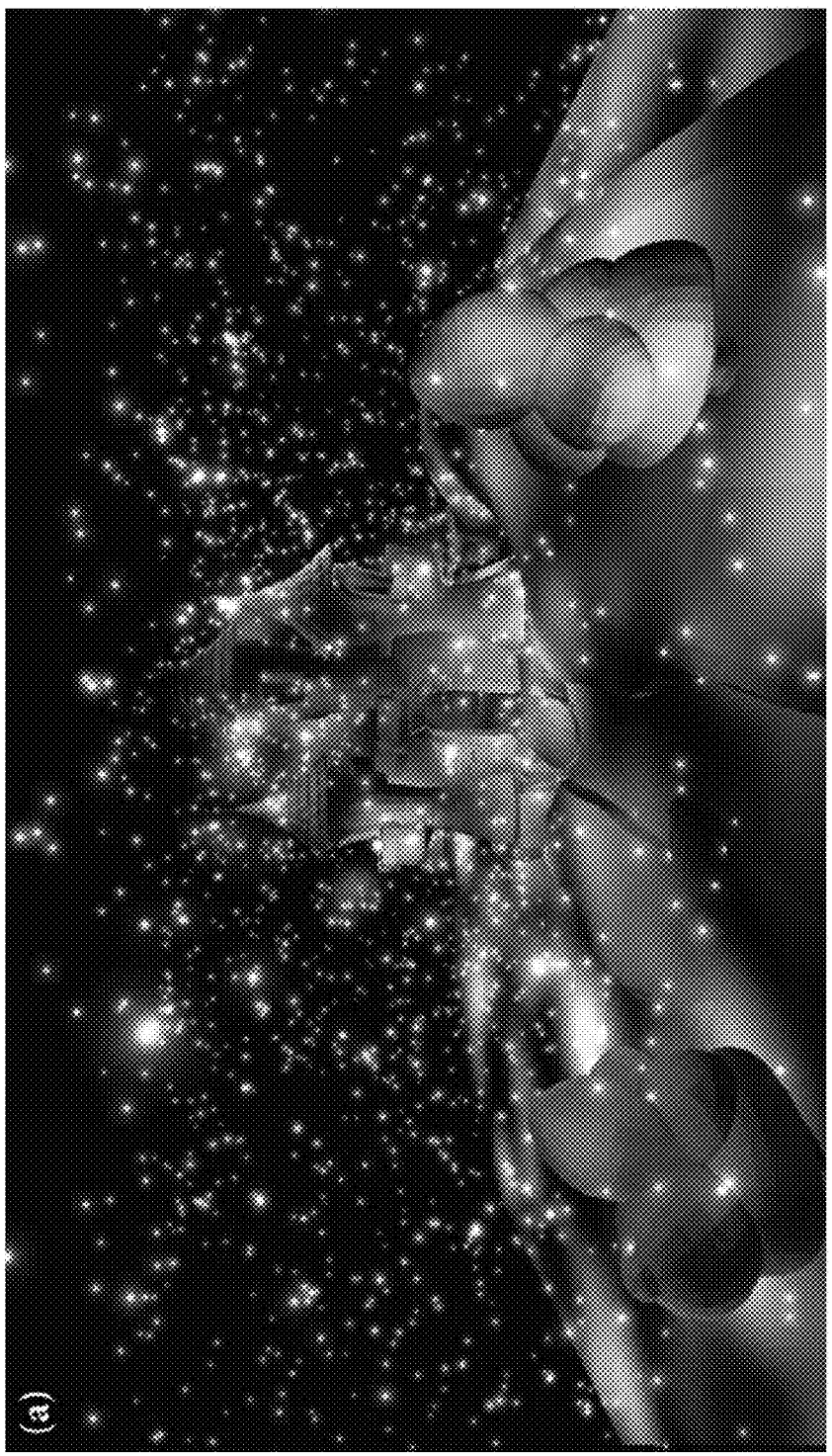
FIG. 9A is an example scene without a large depth variance in accordance with some embodiments.

The above example implementation was applied against several scenes as shown in FIGS. 8A and 9A. The number of lights was counted per tile for forward rendering pipeline with light culling (also referred to as frustum culling) and forward rendering pipeline with 2.5D culling. The first benchmark was performed against the scene in FIG. 8A, which has a large variance in the depth. FIGS. 8B and 8C visualize the number of lights overlapping each tile using the frustum culling and the 2.5D culling embodiments, respectively. In particular, FIG. 8B shows a visualization of the number of lights per tile using frustum culled with maximum and minimum depth values in a tile. FIG. 8B shows that tiles that contain an object's edge capture a large number of lights. The number of overlapping lights is reduced dramatically when 2.5D culling is used as shown in FIG. 8C. FIG. 8B shows that tiles that contain an object's edge capture a large number of lights. The number of lights is reduced dramatically when 2.5D culling is used as shown in FIG. 8C.

Figure 10A:
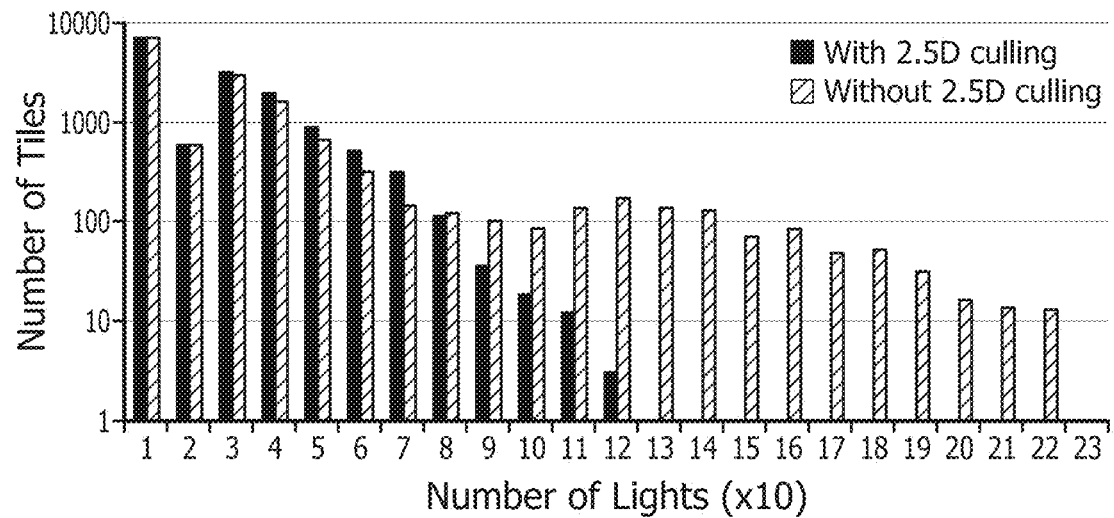
FIGS. 10A and 10B show the number of tiles versus the number of lights for the scenes in FIGS. 8A and 9A, respectively, in accordance with some embodiments.
Figure 10B:
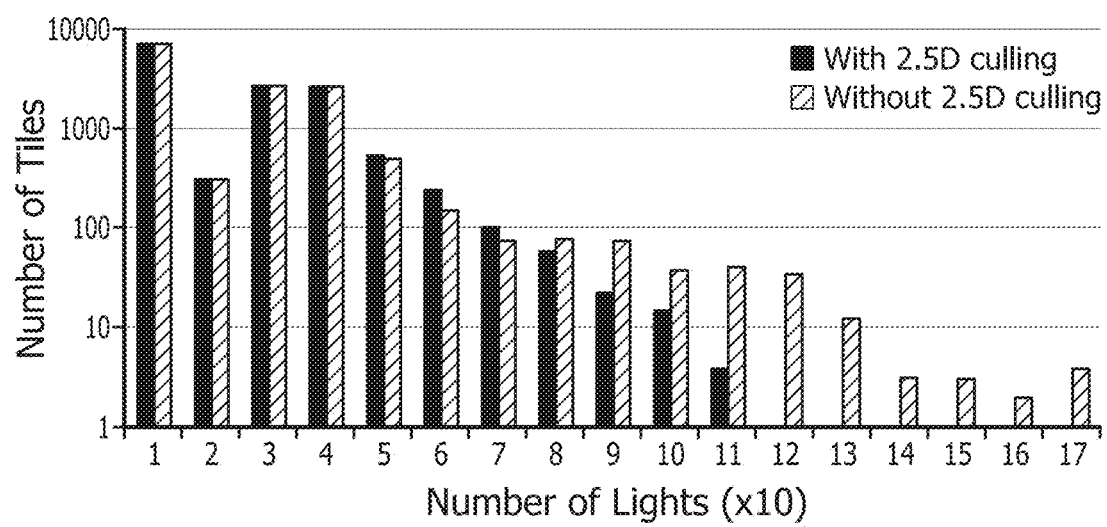

FIGS. 10A and 10B show quantitative numbers for FIGS. 8A and 9A. In particular, the number of lights was counted that overlapped each tile and quantitatively compared for frustum culling and 2.5D culling. As shown in FIG. 10A, there are a lot of tiles with more than 200 lights overlapping when not using the 2.5D culling method. However, by using the 2.5D culling method, a tile has at most 120 overlapping lights. The culling method used impacts the final shading stage in that the 2.5D culling method eliminates a lot of unnecessary memory reads and computation for the final shader.

Figure 9B:
FIGS. 9B and 9C show the number of lights per tile using fustrum culling and 2.5D culling, respectively, in accordance with some embodiments.
Figure 9C:

The 2.5D culling method also has benefits with the scene of FIG. 9A, which does not have as much depth variance as the scene in FIG. 8A. FIG. 9B shows a visualization of the number of lights per tile using frustum culled with maximum and minimum depth values in a tile. FIG. 9C the number of overlapping lights is reduced dramatically when 2.5D culling is used. Because the depth difference is not large in these scenes, the number of lights overlapping a tile, including an edge of an object, is less than in the previous scene. However, color temperature is low when the 2.5D culling is used. The quantitative comparison in FIG. 10B shows that although the improvement is not as large as the FIG. 8A scene, the 2.5D culling method could reduce the number of overlapping lights on tiles.

Figure 11:
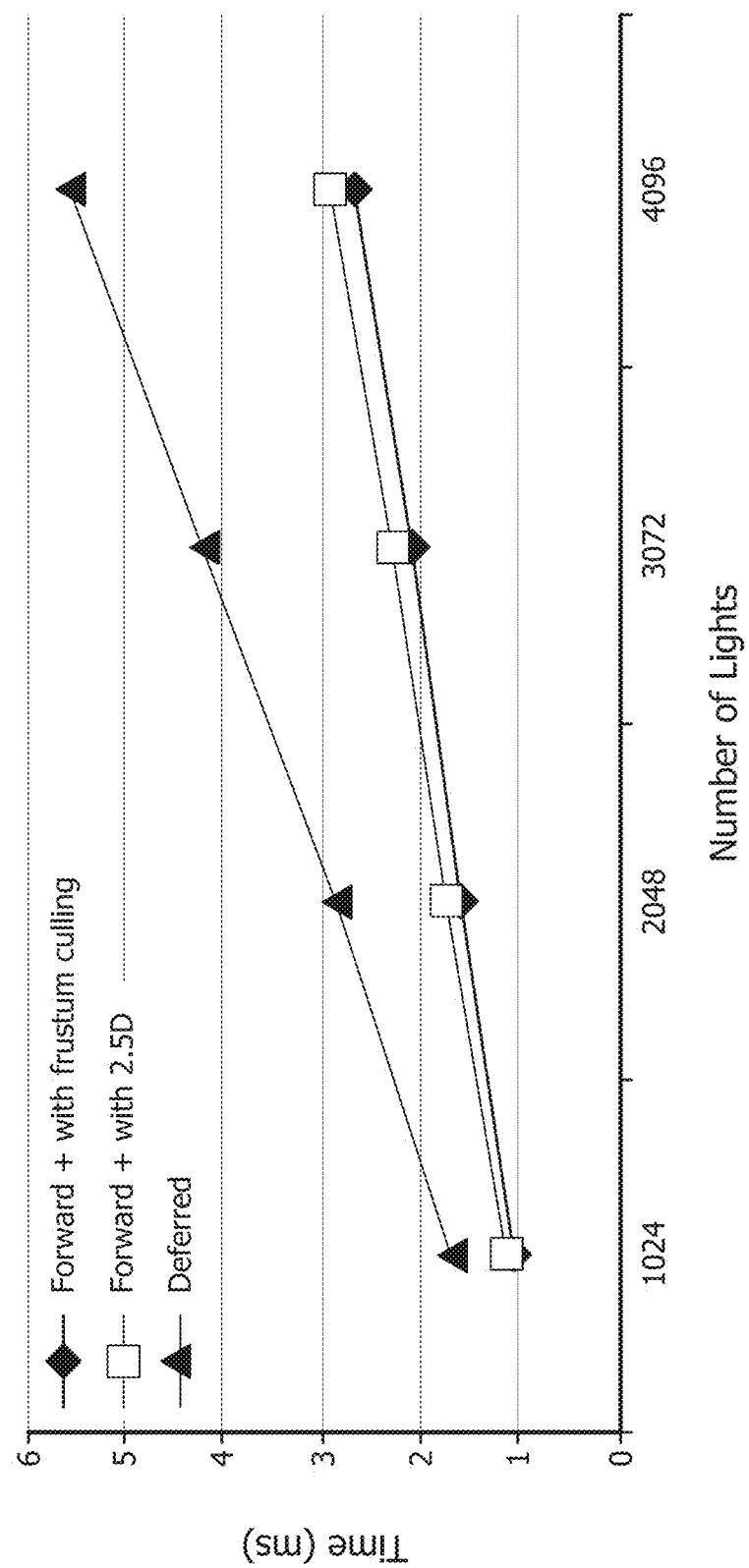
FIG. 11 shows a comparison of computation time for forward rendering pipeline with frustum culling only and frustum culling plus 2.5D culling, respectively, in accordance with some embodiments.

FIG. 11 compares the computation time for the light culling stage for the scene of FIG. 2A using for example, an AMD Radeon HD 7970 GPU. This comparison indicates that the overhead of additional computation in 2.5D culling is less than 10% of the time without the culling. In the case where there are 1,024 lights, the overhead is about 5%. The 2.5D culling is effective regardless of the number of the lights in the scene. FIG. 11 also contains the light accumulation time of the compute-based deferred lighting. As shown, the light-culling stage with the 2.5D culling in the described forward rendering pipeline is much faster than its counterpart in deferred lighting.

Described herein is shadowing from many lights. Shadows from a light can be calculated by a shadow map, from which can be obtained occlusion from the light in the pixel shader when forward rendering pipeline is used. In an example method, a shadow map for each light may be used. This may not practical because shadow map creation—the cost of which is linear to scene complexity—can be prohibitively expensive. The shadow map resolution may be reduced, but this may result in low-quality shadows.

In another example, shadowing determinations rely on rasterization and ray tracing. To check the visibility to a light, a ray be cast to the light. If the light is local, the length of the ray is short. This means there is not much to traverse in the scene, (the cost is not as high as the cost of ray casting a long ray in full ray tracing). Ray casting can be integrated in the forward rendering pipeline to add shadows from hundreds of lights and show that a perfect shadow from hundreds of lights can be obtained in real time. After adding this feature, the described forward rendering pipeline is not just an extension of standard forward-rendering pipeline but a hybrid of standard forward rendering pipeline, deferred-rendering pipelines and ray tracing.

Described herein is an implementation of forward rendering pipeline with shadowing. To ray cast against the scene, the position and normal vector of a primary ray hit and the acceleration data structure for ray casting needs to be obtained. The position of a primary ray hit can be reconstructed from the depth buffer by applying inverse projection. The normal vector of the entire visible surface, which is used to avoid casting rays to a light that is at the back of the surface and to offset the ray origin, can be written at the depth pre-pass and is no longer writing only the depth value. The acceleration structure has to be updated every frame for a dynamic scene. After the pre-pass, implementing a ray cast shadow is straightforward. In a pixel shader, access to all the information about lights is available, which includes light position. A shadow ray can be created by the light position and surface location. Then the ray can be cast against the acceleration structure for an intersection test. If the ray is intersecting, contribution from the light is masked.

Although this naive implementation is easy to implement, it is far from practical in terms of performance. The issue is a legacy of the standard forward rendering pipeline. The number of rays to be cast for each pixel is not constant, which means the computational load or time can vary considerably among pixels even if they belong to the same surface. This results in a poor utilization of the GPU. An alternative is to separate ray casting from pixel shading for better performance. After separating ray casting from pixel shading, the pipeline looks like this: G-pass; light culling; ray cast job creation; ray casting; and final shading.

After indices of lights overlapping each tile are calculated in the light culling stage, ray cast jobs are created and accumulated in a job buffer by iterating through all the screen pixels. This is a screen-space computation in which a thread is executed for a pixel and goes through the list of lights. If a pixel overlaps a light, a ray cast job is created. To create a ray in the ray casting stage, a pixel index is needed to obtain surface position and normal, and a light index against which the ray is cast. These two indices are packed into a 32-bit value and stored in the job buffer. After creating all the ray cast jobs in a buffer, a thread is dispatched for each ray cast job. Then it does not have the issue of uneven load balancing that may be experienced when rays are cast in a pixel shader. Each thread is casting a ray. After identifying whether a shadow ray is blocked, the information has to be stored somewhere to pass to a pixel shader. In regards to a hard shadow, the output from a ray cast is a binary value, and the results from 32 rays are packed into one 32-bit value. But in a scene with hundreds of lights, storing a mask for all of them takes too much space even after the compression. Taking advantage of the fact that there is a list of lights per tile, masks for lights in the list of a tile are only stored. By limiting the number of rays to be cast per pixel to 128, the mask can be encoded as an into value. At the ray casting stage, the result is written to the mask of the pixel using an atomic OR operation to flip the assigned bit. After separating ray casting from pixel shading, the final shading may be kept almost the same as described herein above for forward rendering pipeline. The shadow mask for each pixel needs to be read and whenever a light is processed, the mask is read to get the occlusion.

Figure 12:
FIG. 12 shows an example of shadowing in accordance with some embodiments.

FIG. 12 is a screenshot of a scene with 512 shadow-casting lights. The legs of chairs are casting shadows from many dynamic lights in the scene. The screen resolution was 1,280×720. The number of rays cast for this scene was more than 7 million. A frame computation time is about 32 ms on an AMD Radeon HD 7970 GPU. The G-pass and light culling took negligible time compared to ray cast job creation and ray casting, each of which took 11.57 ms and 19.91 ms for this frame. This is another example of hybrid ray traced and rasterized graphics.

Described herein is a forward rendering pipeline that adds a GPU compute based light culling stage to the traditional forward-rendering pipeline to handle many lights while keeping the flexibility for material usage. Because of its simplicity and flexibility, there are many avenues to extend this pipeline including the use of 2.5D culling, which improves the light-culling efficiency, and dynamic shadowing from many lights.

Figure 13:
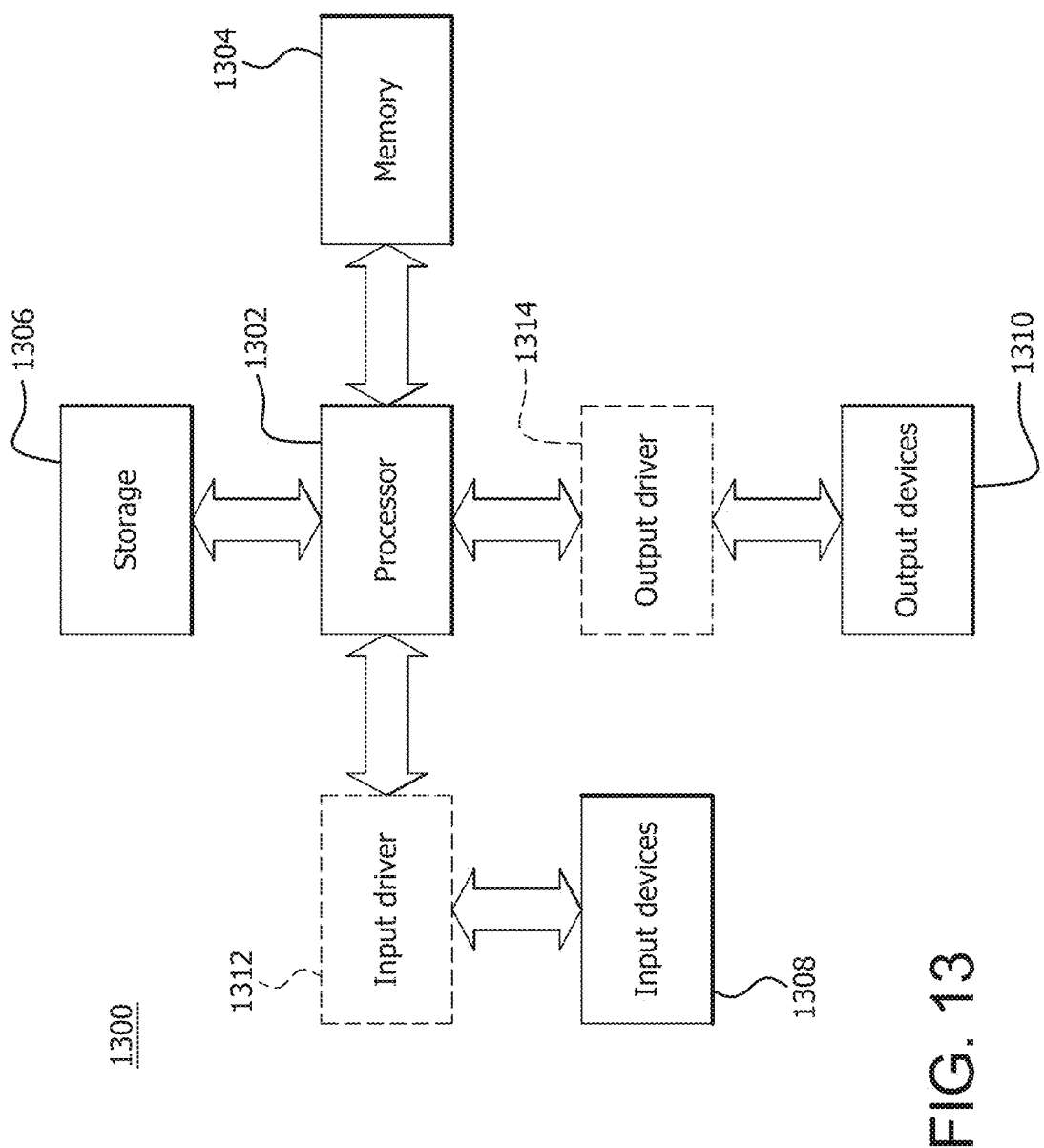
FIG. 13 is a block diagram of an example device in which one or more disclosed embodiments may be implemented.

FIG. 13 is a block diagram of an example device 1300 in which one or more disclosed embodiments may be implemented. The device 1300 may include, for example, a computer, a gaming device, a handheld device, a set-top box, a television, a mobile phone, or a tablet computer. The device 1300 includes a processor 1302, a memory 1304, a storage 1306, one or more input devices 1308, and one or more output devices 1310. The device 1300 may also optionally include an input driver 1312 and an output driver 1314. It is understood that the device 1300 may include additional components not shown in FIG. 13.

The processor 1302 may include a central processing unit (CPU), a graphics processing unit (GPU), a CPU and GPU located on the same die, or one or more processor cores, wherein each processor core may be a CPU or a GPU. The memory 1304 may be located on the same die as the processor 1302, or may be located separately from the processor 1302. The memory 1304 may include a volatile or non-volatile memory, for example, random access memory (RAM), dynamic RAM, or a cache. The processor 1302 may execute the forward rendering method which may be stored as executable code on the memory 1304.

The storage 1306 may include a fixed or removable storage, for example, a hard disk drive, a solid state drive, an optical disk, or a flash drive. The input devices 1308 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 1310 may include a display, a speaker, a printer, a haptic feedback device, one or more lights, an antenna, or a network connection (e.g., a wireless local area network card for transmission and/or reception of wireless IEEE 802 signals).

The input driver 1312 communicates with the processor 1302 and the input devices 1308, and permits the processor 1302 to receive input from the input devices 1308. The output driver 1314 communicates with the processor 1302 and the output devices 1310, and permits the processor 1302 to send output to the output devices 1310. It is noted that the input driver 1312 and the output driver 1314 are optional components, and that the device 1300 will operate in the same manner if the input driver 1312 and the output driver 1314 are not present.

In general, a method for rendering a screen, where the screen includes pixel(s). The screen may be divided into tiles. The method further includes culling, on a per tile basis, a light list to generate a list of light indices overlapping each pixel and performing surface shading by evaluating materials using information related to each light index. In some embodiments, the method may include performing a depth pre-pass for each pixel in the screen. The method may further include generating a frustum for each tile and clipping the frustum using maximum and minimum depth values for pixels in the tile. In some embodiments, the method may further include dividing a depth extent of the frustum into cells and generating cell indices based on depth values of each pixel in the tile. A tile depth mask may be generated that includes cells marked as occupied with respect to a particular pixel and a light depth mask for each light may be generated, where cells are flagged in the light depth mask on a condition that light geometry overlaps the frustum. The culling may then be performed by comparing the light depth mask and the tile depth mask.

In some embodiments, the method may further include generating a reflective shadow map for indirect lights, generating spotlights based on the reflective shadow map and appending the light list with the spotlights. In some embodiments, shadows for each light in the list of light indices may be determined using ray casting.

In another embodiment, a method for rendering a screen includes generating a reflective shadow map for indirect lights, generating depth values for each pixel in the screen, generating spotlights based on the reflective shadow map, appending a light list with the spotlights, dividing the screen into tiles, culling the light list to a list of light indices affecting a pixel, and shading a surface by evaluating materials using information related to each light index.

The above methods may be implemented, in addition to the shaders, modules and engines described herein above, using a compute shader, a pixel shader, a shader engine, and a map generation module. In some embodiments, these may be implemented in a processor as described herein, a GPU and the like.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a non-transitory computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for rendering a screen, the screen composed of pixels, comprising:
   culling, on a per tile basis, a light list to generate a list of light indices overlapping each pixel; and
   performing surface shading by evaluating materials using information related to each light index,
   wherein the culling and performing surface shading are executed in a graphics rendering pipeline using a graphics processing unit, the culling and performing surface shading at least limiting a number of shader permutations executed and reducing pixel overdraw in the graphics rendering pipeline using the graphics processing unit.

2. The method of claim 1, further comprising:
   performing a depth pre-pass for each pixel in the screen.

3. The method of claim 1, further comprising:
   generating a frustum for each tile; and
   clipping the frustum using maximum and minimum depth values for pixels in the tile.

4. The method of claim 1, further comprising:
   generating a reflective shadow map for indirect lights.

5. The method of claim 4, further comprising:
   generating spotlights based on the reflective shadow map; and
   appending the light list with the spotlights.

6. The method of claim 3, further comprising:
   dividing a depth extent of the frustum into cells; and
   generating cell indices based on depth values of each pixel in the tile.

7. The method of claim 6, further comprising:
   generating a tile depth mask that includes cells marked as occupied with respect to a particular pixel.

8. The method of claim 7, further comprising:
   generating a light depth mask for each light, wherein cells are flagged in the light depth mask on a condition that light geometry overlaps the frustum.

9. The method of claim 8, wherein culling includes comparing the light depth mask and the tile depth mask.

10. The method of claim 1, further comprising:
    determining shadows for each light in the list of light indices using ray casting.

11. A method for rendering a screen, comprising:
    generating depth values for each pixel in the screen;
    culling a light list to a list of light indices affecting a pixel; and
    shading a surface by evaluating materials using information related to each light index,
    wherein the generating, culling and shading are executed in a graphics rendering pipeline using a graphics processing unit, the generating, culling and shading at least limiting a number of shader permutations executed and reducing pixel overdraw in the graphics rendering pipeline using the graphics processing unit.

12. The method of claim 11, further comprising:
    dividing the screen into tiles.

13. The method of claim 12, further comprising:
    generating one or more of a reflective shadow map for indirect lights and spotlights.

14. The method of claim 13, wherein said spotlights generated are based on a reflective shadow map.

15. The method of claim 12, further comprising:
    dividing a depth extent of the frustum into cells; and
    generating cell indices based on depth values of each pixel in the tile.

16. The method of claim 12, further comprising:
    generating a tile depth mask that includes cells marked as occupied with respect to a particular pixel; and generating a light depth mask for each light, wherein cells are flagged in the light depth mask on a condition that light geometry overlaps the frustum;
wherein culling further includes comparing the light depth mask and the tile depth mask.

17. The method of claim 11, further comprising:
determining shadows for each light in the list of light indices using ray casting.

18. A processor for rendering a screen, the screen comprising at least one pixel, comprising:
a compute shader configured to cull, on a per tile basis, a light list to a list of light indices overlapping each pixel; and
a pixel shader configured to perform surface shading by evaluating materials using information related to each light index,
wherein the compute shader and pixel shader are parts of a graphics rendering pipeline in the processor, and operate to at least limit a number of shader permutations executed and reduce pixel overdraw in the graphics rendering pipeline using the processor.

19. The processor of claim 18, further comprising:
a shader engine configured to perform a depth pre-pass for each pixel in the screen.

20. The processor of claim 18, wherein:
the compute shader configured to generate a frustum for each tile; and
the compute shader configured to clip the frustum using maximum and minimum depth values for pixels in the tile.

21. The processor of claim 18, further comprising:
a map generation module configured to generate a reflective shadow map for indirect lights.

22. The processor of claim 18, wherein:
the compute shader configured to generate spotlights based on reflective shadow map; and
the compute shader configured to append the light list with the spotlights.

23. The processor of claim 18, further comprising:
the compute shader configured to divide a depth extent of the frustum into cells;
the compute shader configured to generate cell indices based on depth values of each pixel in the tile;
the compute shader configured to generate a tile depth mask that includes cells marked as occupied with respect to a particular pixel; and
the compute shader configured to generate a light depth mask for each light, wherein cells are flagged in the light depth mask on a condition that light geometry overlaps the frustum,
wherein cull includes comparing the light depth mask and the tile depth mask to generate the list of light indices.

24. The processor of claim 18, further comprising:
a shader engine configured to determine shadows for each light in the list of light indices using ray casting.

25. The processor of claim 18, wherein the compute shader is configured to divide the screen into tiles, the screen having at least one pixel.

26. A computer readable non-transitory medium including instructions which when executed in a processing system cause the processing system to execute a method for rendering a screen:
a compute shader code segment culling, on a per tile basis, a light list to a list of light indices overlapping each pixel; and
a pixel shader code segment for performing surface shading by evaluating materials using information related to each light index,
wherein the compute shader and pixel shader are executed in a graphics rendering pipeline using the processing system, and operate to at least limit a number of shader permutations executed and reduce pixel overdraw in the graphics rendering pipeline using the processing system.

27. The computer readable non-transitory medium of claim 26, further comprising:
a compute shader code segment for dividing the screen into tiles, the screen having at least one pixel.

* * * * *